US011543832B2

(12) United States Patent
Baldwin (10) Patent No.: US 11,543,832 B2
(45) Date of Patent: Jan. 3, 2023

(54) METHOD AND APPARATUS FOR CONTROLLING AN AUTONOMOUS VEHICLE

(71) Applicant: Aptiv Technologies Limited, St. Michael (BB)

(72) Inventor: Craig A. Baldwin, Pleasant Ridge, MI (US)

(73) Assignee: Aptiv Technologies Limited, St. Michael (BB)

( * ) Notice: Subject to any disclaimer, the term of this patent is extended or adjusted under 35 U.S.C. 154(b) by 165 days.

(21) Appl. No.: 17/171,598

(22) Filed: Feb. 9, 2021

(65) Prior Publication Data
US 2021/0165420 A1 Jun. 3, 2021

Related U.S. Application Data

(62) Division of application No. 16/208,828, filed on Dec. 4, 2018, now Pat. No. 10,948,924, which is a division
(Continued)

(51) Int. Cl.
*G05D 1/02* (2020.01)
*B60W 30/18* (2012.01)

(52) U.S. Cl.
CPC ..... *G05D 1/0274* (2013.01); *B60W 30/18154* (2013.01); *B60W 30/18163* (2013.01);
(Continued)

(58) Field of Classification Search
CPC .. G05D 1/0274; G05D 1/0214; G05D 1/0248; G05D 1/0289; G05D 1/0246;
(Continued)

(56) References Cited

U.S. PATENT DOCUMENTS 5,629,690 A  5/1997 Knoll
5,995,898 A  11/1999 Tuttle
(Continued)

FOREIGN PATENT DOCUMENTS

EP  3078987  10/2016
JP  H07190732  7/1995
(Continued)

OTHER PUBLICATIONS

"Corrected Notice of Allowance", U.S. Appl. No. 16/172,133, dated Mar. 24, 2021, 2 pages.
(Continued)

*Primary Examiner* — Gertrude Arthur Jeanglaude
(74) *Attorney, Agent, or Firm* — Sawtooth Patent Group PLLC (57) ABSTRACT

A method for operating an automated vehicle includes controlling by one or more computing devices an autonomous vehicle; receiving by one or more computing devices sensor data from the vehicle corresponding to moving objects in a vicinity of the vehicle; receiving by one or more computing devices road condition data; and determining by one or more computing devices undesirable locations related to the moving objects. The undesirable locations related to the moving objects for the vehicle are based at least in part on the road condition data. The step of controlling the vehicle includes avoiding the undesirable locations.

21 Claims, 9 Drawing Sheets

Related U.S. Application Data of application No. 15/545,957, filed as application No. PCT/US2015/064282 on Dec. 7, 2015, now Pat. No. 10,678,261.

(60) Provisional application No. 62/112,775, filed on Feb. 6, 2015.

(52) U.S. Cl.
CPC .......... *G05D 1/0214* (2013.01); *G05D 1/0248* (2013.01); *G05D 1/0289* (2013.01); G05D 1/0246 (2013.01); G05D 1/0257 (2013.01); G05D 2201/0213 (2013.01)

(58) Field of Classification Search
CPC ........ G05D 1/0257; G05D 2201/0213; B60W 30/18154; B60W 30/18163
See application file for complete search history.

(56) References Cited

U.S. PATENT DOCUMENTS

| | | |
|---|---|---|
| 6,442,473 B1 | 8/2002 | Berstis et al. |
| 6,526,352 B1 | 2/2003 | Breed et al. |
| 6,707,391 B1 | 3/2004 | Monroe |
| 6,747,779 B1 | 6/2004 | Morin et al. |
| 6,810,321 B1 | 10/2004 | Cook |
| 6,862,537 B2 | 3/2005 | Skrbina et al. |
| 6,864,784 B1 | 3/2005 | Loeb |
| 6,919,917 B1 | 7/2005 | Janssen |
| 6,959,994 B2 | 11/2005 | Fujikawa et al. |
| 7,075,427 B1 | 7/2006 | Pace et al. |
| 7,103,460 B1 | 9/2006 | Breed |
| 7,637,631 B2 | 12/2009 | McDermott et al. |
| 8,199,046 B2 | 6/2012 | Nanami |
| 8,478,472 B2 | 7/2013 | Bageshwar et al. |
| 8,480,142 B2 | 7/2013 | Wuerfel |
| 8,521,352 B1 | 8/2013 | Ferguson et al. |
| 8,589,014 B2 | 11/2013 | Fairfield et al. |
| 8,600,606 B2 | 12/2013 | Nickolaou et al. |
| 8,612,135 B1 | 12/2013 | Montemerlo et al. |
| 8,718,861 B1 | 5/2014 | Montemerlo et al. |
| 8,781,669 B1 | 7/2014 | Teller et al. |
| 8,818,682 B1 | 8/2014 | Dolgov et al. |
| 8,825,259 B1 | 9/2014 | Ferguson et al. |
| 8,825,265 B1 | 9/2014 | Ferguson et al. |
| 8,849,494 B1 | 9/2014 | Herbach et al. |
| 8,855,849 B1 | 10/2014 | Ferguson et al. |
| 8,874,267 B1 | 10/2014 | Dolgov et al. |
| 8,874,305 B2 | 10/2014 | Dolgov et al. |
| 8,874,372 B1 | 10/2014 | Zhu et al. |
| 8,880,272 B1 | 11/2014 | Ferguson et al. |
| 8,935,034 B1 | 1/2015 | Zhu et al. |
| 9,274,526 B2 | 3/2016 | Murai et al. |
| 9,377,531 B2 | 6/2016 | Rostocki et al. |
| 9,429,440 B2 | 8/2016 | Harada |
| 9,501,058 B1 | 11/2016 | Mariet |
| 10,083,607 B2 | 9/2018 | Ginsberg et al. |
| 10,209,717 B2 | 2/2019 | Hazelton |
| 10,311,724 B2 | 6/2019 | Ginsberg et al. |
| 10,525,901 B2 | 1/2020 | Lewis et al. |
| 10,678,261 B2 | 6/2020 | Baldwin |
| 10,948,924 B2 | 3/2021 | Baldwin et al. |
| 10,991,247 B2 | 4/2021 | Baldwin et al. |
| 2005/0187701 A1 | 8/2005 | Baney |
| 2005/0280552 A1 | 12/2005 | DiPiazza |
| 2007/0005202 A1 | 1/2007 | Breed |
| 2007/0005609 A1 | 1/2007 | Breed |
| 2007/0046448 A1 | 3/2007 | Smitherman |
| 2007/0055446 A1 | 3/2007 | Schiffmann et al. |
| 2007/0152804 A1* | 7/2007 | Breed .................... G01S 19/17 701/301 |
| 2008/0225395 A1 | 9/2008 | Veerasamy |
| 2009/0140887 A1 | 6/2009 | Breed et al. |
| 2009/0164109 A1 | 6/2009 | Maruyama |
| 2010/0007523 A1 | 1/2010 | Hatav |
| 2010/0013615 A1 | 1/2010 | Herbert et al. |
| 2010/0023183 A1 | 1/2010 | Huang et al. |
| 2010/0026555 A1 | 2/2010 | Whittaker et al. |
| 2010/0063720 A1 | 3/2010 | Machino |
| 2010/0073194 A1 | 3/2010 | Ghazarian |
| 2010/0104199 A1 | 4/2010 | Zhang et al. |
| 2010/0106356 A1 | 4/2010 | Trepagnier et al. |
| 2010/0238006 A1 | 9/2010 | Grider et al. |
| 2011/0012755 A1 | 1/2011 | Mudalige |
| 2011/0125405 A1 | 5/2011 | Blesener et al. |
| 2011/0161987 A1 | 6/2011 | Huang et al. |
| 2011/0163904 A1 | 7/2011 | Alland et al. |
| 2011/0184605 A1 | 7/2011 | Neff |
| 2011/0210866 A1 | 9/2011 | Klaus et al. |
| 2012/0022776 A1 | 1/2012 | Razavilar |
| 2012/0039084 A1 | 2/2012 | Eckhardt et al. |
| 2012/0041632 A1 | 2/2012 | Bordes |
| 2012/0083987 A1 | 4/2012 | Schwindt |
| 2012/0139754 A1 | 6/2012 | Ginsberg et al. |
| 2012/0166033 A1 | 6/2012 | Byun et al. |
| 2012/0169526 A1 | 7/2012 | Reihac |
| 2012/0249794 A1 | 10/2012 | Kiyo et al. |
| 2012/0274481 A1 | 11/2012 | Ginsberg et al. |
| 2012/0277967 A1 | 11/2012 | Isaji et al. |
| 2012/0296539 A1 | 11/2012 | Cooprider et al. |
| 2013/0110368 A1 | 5/2013 | Zagorski |
| 2013/0127190 A1 | 5/2013 | Shamoto |
| 2013/0131908 A1 | 5/2013 | Trepagnier et al. |
| 2013/0184926 A1 | 7/2013 | Spero et al. |
| 2013/0191022 A1 | 7/2013 | Mathes et al. |
| 2013/0218396 A1 | 8/2013 | Moshchuk et al. |
| 2013/0231825 A1 | 9/2013 | Chundrlik et al. |
| 2013/0265563 A1 | 10/2013 | Vogt et al. |
| 2013/0271292 A1 | 10/2013 | McDermott |
| 2013/0321627 A1 | 12/2013 | Turn et al. |
| 2013/0338858 A1 | 12/2013 | Cherepinsky |
| 2014/0012455 A1 | 1/2014 | Neff |
| 2014/0032093 A1 | 1/2014 | Mills |
| 2014/0081507 A1 | 3/2014 | Urmson |
| 2014/0081573 A1 | 3/2014 | Urmson et al. |
| 2014/0191882 A1 | 7/2014 | Varma |
| 2014/0204599 A1 | 7/2014 | Miura et al. |
| 2014/0210646 A1 | 7/2014 | Subramanua |
| 2014/0297093 A1 | 10/2014 | Murai et al. |
| 2014/0330479 A1 | 11/2014 | Dolgov et al. |
| 2015/0006005 A1 | 1/2015 | Yu et al. |
| 2015/0019080 A1 | 1/2015 | Schneider |
| 2015/0041510 A1 | 2/2015 | Frenzel et al. |
| 2015/0100189 A1 | 4/2015 | Tellis et al. |
| 2015/0124096 A1 | 5/2015 | Koravadi |
| 2016/0004915 A1 | 1/2016 | Chen et al. |
| 2016/0035221 A1 | 2/2016 | McDevitt-Pimbley et al. |
| 2016/0035223 A1 | 2/2016 | Gutmann et al. |
| 2016/0161267 A1 | 6/2016 | Harada |
| 2016/0231746 A1* | 8/2016 | Hazelton .............. G05D 1/0274 |
| 2017/0039850 A1 | 2/2017 | Vanden Berg et al. |
| 2017/0371036 A1 | 12/2017 | Griffin |
| 2018/0004220 A1 | 1/2018 | Hazelton |
| 2018/0004221 A1 | 1/2018 | Hazelton |
| 2018/0004223 A1 | 1/2018 | Baldwin |
| 2018/0012492 A1 | 1/2018 | Baldwin et al. |
| 2018/0031696 A1 | 2/2018 | Lewis et al. |
| 2018/0037171 A1 | 2/2018 | Lewis et al. |
| 2018/0045826 A1 | 2/2018 | Kasaba et al. |
| 2018/0129215 A1 | 5/2018 | Hazelton et al. |
| 2019/0003895 A1 | 1/2019 | Krishnan et al. |
| 2019/0066498 A1 | 2/2019 | Baldwin et al. |
| 2019/0101929 A1 | 4/2019 | Baldwin |
| 2019/0202355 A1 | 7/2019 | Tatara et al. |
| 2019/0210436 A1 | 7/2019 | Frederick et al. |
| 2020/0341487 A1 | 10/2020 | Hazelton et al. |
| 2021/0201678 A1 | 7/2021 | Baldwin et al. |

FOREIGN PATENT DOCUMENTS

| | | |
|---|---|---|
| JP | 2004326705 | 11/2004 |
| JP | 2007106199 | 4/2007 |
| JP | 2008003959 | 1/2008 |

(56) References Cited

FOREIGN PATENT DOCUMENTS

| | | |
|---|---|---|
| JP | 2008008870 | 1/2008 |
| JP | 2010260493 | 11/2010 |
| JP | 2014148293 | 8/2014 |
| JP | 2014148393 | 8/2014 |
| JP | 2014211862 | 11/2014 |
| KR | 20010109873 | 12/2001 |
| KR | 20100068944 | 6/2010 |
| KR | 20110023952 | 3/2011 |
| KR | 101071914 | 10/2011 |
| KR | 20120072020 | 7/2012 |
| KR | 20130026934 | 3/2013 |
| WO | 2009070069 | 6/2009 |
| WO | 2016126319 | 8/2016 |
| WO | 2016126323 | 8/2016 |
| WO | 20160126318 | 8/2016 |
| WO | 2019059026 | 3/2019 |

OTHER PUBLICATIONS

"Supplemental Notice of Allowance", U.S. Appl. No. 16/208,828, dated Feb. 19, 2021, 2 pages.
"Advisory Action", U.S. Appl. No. 15/549,061, dated Apr. 29, 2019, 6 pages.
"Advisory Action", U.S. Appl. No. 15/545,957, dated Jul. 16, 2019, 3 pages.
"Final Office Action", U.S. Appl. No. 15/546,196, dated Aug. 28, 2018, 16 pages.
"Final Office Action", U.S. Appl. No. 15/545,957, dated Apr. 17, 2019, 22 pages.
"Final Office Action", U.S. Appl. No. 15/792,960, dated Sep. 22, 2020, 7 pages.
"Final Office Action", U.S. Appl. No. 15/549,061, dated Feb. 7, 2019, 9 pages.
"International Preliminary Report on Patentability", Application No. PCT/US2015/064235, dated Aug. 17, 2017, 12 pages.
"International Preliminary Report on Patentability", Application No. PCT/US2015/064243, dated Aug. 17, 2017, 12 pages.
"International Preliminary Report on Patentability", Application No. PCT/US2015/064282, dated Aug. 17, 2017, 16 pages.
"International Preliminary Report on Patentability", Application No. PCT/US2015/064225, dated Aug. 17, 2017, 6 pages.
"International Preliminary Report on Patentability", Application No. PCT/US2015/064283, dated Aug. 17, 2017, 6 pages.
"International Preliminary Report on Patentability", Application No. PCT/US2015/064289, dated Aug. 17, 2017, 6 pages.
"International Preliminary Report on Patentability", Application No. PCT/US2016/014797, dated Aug. 17, 2017, 6 pages.
"International Preliminary Report on Patentability", Application No. PCT/US2015/064231, dated Aug. 17, 2017, 7 pages.
"International Preliminary Report on Patentability", Application No. PCT/US2015/064240, dated Aug. 17, 2017, 7 pages.
"International Preliminary Report on Patentability", Application No. PCT/US2016/016045, dated Aug. 17, 2017, 7 pages.
"International Search Report and Written Opinion", Application No. PCT/US2015/064243, dated Mar. 30, 2016, 13 pages.
"International Search Report and Written Opinion", Application No. PCT/US2015/064235, dated Mar. 22, 2016, 14 pages.
"International Search Report and Written Opinion", Application No. PCT/US2015/064282, dated Mar. 18, 2016, 17 pages.
"International Search Report and Written Opinion", Application No. PCT/US2015/064289, dated Mar. 2, 2016, 7 pages.
"International Search Report and Written Opinion", Application No. PCT/US2015/064283, dated Apr. 15, 2016, 7 pages.
"International Search Report and Written Opinion", Application No. PCT/US2015/064225, dated Apr. 22, 2016, 7 pages.
"International Search Report and Written Opinion", Application No. PCT/US2016/014797, dated May 11, 2016, 7 pages.
"International Search Report and Written Opinion", Application No. PCT/US2015/064240, dated Mar. 18, 2016, 8 pages.
"International Search Report and Written Opinion", Application No. PCT/US2015/064231, dated May 30, 2016, 8 pages.
"International Search Report and Written Opinion", Application No. PCT/US2016/016045, dated May 24, 2016, 9 pages.
"Non-Final Office Action", U.S. Appl. No. 15/549,061, dated Sep. 5, 2018, 11 pages.
"Non-Final Office Action", U.S. Appl. No. 15/545,960, dated Jun. 15, 2018, 12 pages.
"Non-Final Office Action", U.S. Appl. No. 15/545,957, dated Oct. 15, 2018, 15 pages.
"Non-Final Office Action", U.S. Appl. No. 15/545,957, dated Aug. 16, 2019, 19 pages.
"Non-Final Office Action", U.S. Appl. No. 15/546,196, dated Apr. 5, 2018, 22 pages.
"Non-Final Office Action", U.S. Appl. No. 15/792,960, dated Mar. 19, 2020, 6 pages.
"Non-Final Office Action", U.S. Appl. No. 15/545,944, dated May 18, 2018, 6 pages.
"Non-Final Office Action", U.S. Appl. No. 14/983,695, dated Aug. 1, 2017, 6 pages.
"Non-Final Office Action", U.S. Appl. No. 16/172,133, dated Oct. 16, 2020, 7 pages.
"Non-Final Office Action", U.S. Appl. No. 15/544,283, dated Jun. 8, 2018, 8 pages.
"Non-Final Office Action", U.S. Appl. No. 16/208,828, dated Jul. 21, 2020, 9 pages.
"Notice of Allowance", U.S. Appl. No. 15/545,957, dated Mar. 12, 2020, 10 pages.
"Notice of Allowance", U.S. Appl. No. 15/549,025, dated Sep. 3, 2019, 7 pages.
"Notice of Allowance", U.S. Appl. No. 16/208,828, dated Nov. 12, 2020, 7 pages.
"Notice of Allowance", U.S. Appl. No. 15/545,944, dated Oct. 19, 2018, 8 pages.
"Notice of Allowance", U.S. Appl. No. 16/172,133, dated Dec. 18, 2020, 9 pages.
"Restriction Requirement", U.S. Appl. No. 15/792,960, dated Jan. 9, 2020, 6 pages.
"Restriction Requirement", U.S. Appl. No. 14/983,695, dated Jun. 29, 2017, 8 pages.
"Restriction Requirement", U.S. Appl. No. 15/545,957, dated Sep. 17, 2018, 9 pages.

* cited by examiner

METHOD AND APPARATUS FOR CONTROLLING AN AUTONOMOUS VEHICLE

CROSS-REFERENCE TO RELATED APPLICATIONS

This application is a divisional of U.S. application Ser. No. 16/208,828, filed on Dec. 4, 2018, which in turn is a divisional of U.S. application Ser. No. 15/545,957, filed on Jul. 24, 2017, which in turn claims the benefit under 35 U.S.C. section 371 of PCT Patent Application Number PCT/US2015/064282, filed Dec. 7, 2015 which claims the benefit under 35 U.S.C. section 119(e) of U.S. Provisional Patent Application No. 62/112,775, filed Feb. 6, 2015, the entire disclosures of which are hereby incorporated herein by reference.

FIELD OF THE INVENTION

This disclosure generally relates to autonomous vehicle guidance systems, including methods for positioning an autonomous vehicle on a roadway along with destination-based navigation methods.

BACKGROUND

Autonomous vehicles typically utilize multiple data sources to determine their location, to identify other vehicles, to identify potential hazards, and to develop navigational routing strategies. These data sources can include a central map database that is preloaded with road locations and traffic rules corresponding to areas on the map. Data sources can also include a variety of sensors on the vehicle itself to provide real-time information relating to road conditions, other vehicles and transient hazards of the type not typically included on a central map database.

In many instances a mismatch can occur between the map information and the real-time information sensed by the vehicle. Various strategies have been proposed for dealing with such a mismatch. For example, U.S. Pat. No. 8,718,861 to Montemerlo et al. teaches detecting deviations between a detailed map and sensor data and alerting the driver to take manual control of the vehicle when the deviations exceed a threshold. U.S. Pub. No. 2014/0297093 to Murai et al. discloses a method of correcting an estimated position of the vehicle by detecting an error in the estimated position, in particular when a perceived mismatch exists between road location information from a map database and from vehicle sensors, and making adjustments to the estimated position.

A variety of data sources can be used for the central map database. For example, the Waze application provides navigational mapping for vehicles. Such navigational maps include transient information about travel conditions and hazards uploaded by individual users. Such maps can also extract location and speed information from computing devices located within the vehicle, such as a smart phone, and assess traffic congestion by comparing the speed of various vehicles to the posted speed limit for a designated section of roadway.

Strategies have also been proposed in which the autonomous vehicle will identify hazardous zones relative to other vehicles, such as blind spots. For example, U.S. Pat. No. 8,874,267 to Dolgov et al. discloses such a system. Strategies have also been developed for dealing with areas that are not detectable by the sensors on the vehicle. For example, the area behind a large truck will be mostly invisible to the sensors on an autonomous vehicle. U.S. Pat. No. 8,589,014 to Fairfield et al. teaches a method of calculating the size and shape of an area of sensor diminution caused by an obstruction and developing a new sensor field to adapt to the diminution.

Navigational strategies for autonomous vehicles typically include both a destination-based strategy and a position-based strategy. Destination strategies involve how to get from point 'A' to point 'B' on a map using known road location and travel rules. These involve determining a turn-by-turn path to direct the vehicle to the intended destination. Position strategies involve determining optimal locations for the vehicle (or alternatively, locations to avoid) relative to the road surface and to other vehicles. Changes to these strategies are generally made during the operation of the autonomous vehicle in response to changing circumstances, such as changes in the position of surrounding vehicles or changing traffic conditions that trigger a macro-level rerouting evaluation by the autonomous vehicle.

Position-based strategies have been developed that automatically detect key behaviors of surrounding vehicles. For example, U.S. Pat. No. 8,935,034 to Zhu et al. discloses a method for detecting when a surrounding vehicle has performed one of several pre-defined actions and altering the vehicle control strategy based on that action.

One of many challenges for controlling autonomous vehicles is managing interactions between autonomous vehicles and human-controlled vehicles in situations that are often handled by customs that are not easily translated into specific driving rules.

SUMMARY

One aspect of the disclosure involves a method comprising controlling by one or more computing devices an autonomous vehicle in accordance with a first control strategy; developing by one or more computing devices said first control strategy based at least in part on data contained on a first map; receiving by one or more computing devices sensor data from said vehicle corresponding to a first set of data contained on said first map; comparing said sensor data to said first set of data on said first map on a periodic basis; developing a first correlation rate between said sensor data and said first set of data on said first map; and adopting a second control strategy when said correlation rate drops below a predetermined value.

Another aspect of the disclosure involves a method comprising controlling by one or more computing devices an autonomous vehicle in accordance with a first control strategy; receiving by one or more computing devices map data corresponding to a route of said vehicle; developing by one or more computing devices a lane selection strategy; receiving by one or more computing devices sensor data from said vehicle corresponding to objects in the vicinity of said vehicle; and changing said lane selection strategy based on changes to at least one of said sensor data and said map data.

Another aspect of the disclosure involves a method comprising controlling by one or more computing devices an autonomous vehicle in accordance with a first control strategy; receiving by one or more computing devices sensor data from said vehicle corresponding to moving objects in the vicinity of said vehicle; receiving by one or more computing devices road condition data; determining by one or more computing devices undesirable locations for said vehicle relative to said moving objects; and wherein said step of determining undesirable locations for said vehicle is based at least in part on said road condition data.

Another aspect of the disclosure involves a method comprising controlling by one or more computing devices an autonomous vehicle in accordance with a first control strategy; developing by one or more computing devices said first control strategy based at least in part on data contained on a first map, wherein said first map is simultaneously accessible by more than one vehicle; receiving by one or more computing devices sensor data from said vehicle corresponding to objects in the vicinity of said vehicle; and updating by said one or more computing devices said first map to include information about at least one of said objects.

Another aspect of the disclosure involves a method comprising controlling by one or more computing devices an autonomous vehicle; activating a visible signal on said autonomous vehicle when said vehicle is being controlled by said one or more computing devices; and keeping said visible signal activated during the entire time that said vehicle is being controlled by said one or more computing devices.

Another aspect of the disclosure involves a method comprising controlling by one or more computing devices an autonomous vehicle in accordance with a first control strategy; receiving by one or more computing devices sensor data corresponding to a first location; detecting a first moving object at said first location; changing said first control strategy based on said sensor data relating to said first moving object; and wherein said sensor data is obtained from a first sensor that is not a component of said autonomous vehicle.

Another aspect of the disclosure involves a method comprising controlling by one or more computing devices an autonomous vehicle in accordance with a first control strategy; approaching an intersection with said vehicle; receiving by one or more computing devices sensor data from said autonomous vehicle corresponding to objects in the vicinity of said vehicle; determining whether another vehicle is at said intersection based on said sensor data; determining by said one or more computing devices whether said other vehicle or said autonomous vehicle has priority to proceed through said intersection; and activating a yield signal to indicate to said other vehicle that said autonomous vehicle is yielding said intersection.

BRIEF DESCRIPTION OF THE DRAWINGS

The foregoing brief description will be understood more completely from the following detailed description of the exemplary drawings, in which.

DETAILED DESCRIPTION

Overview

Figure 1:
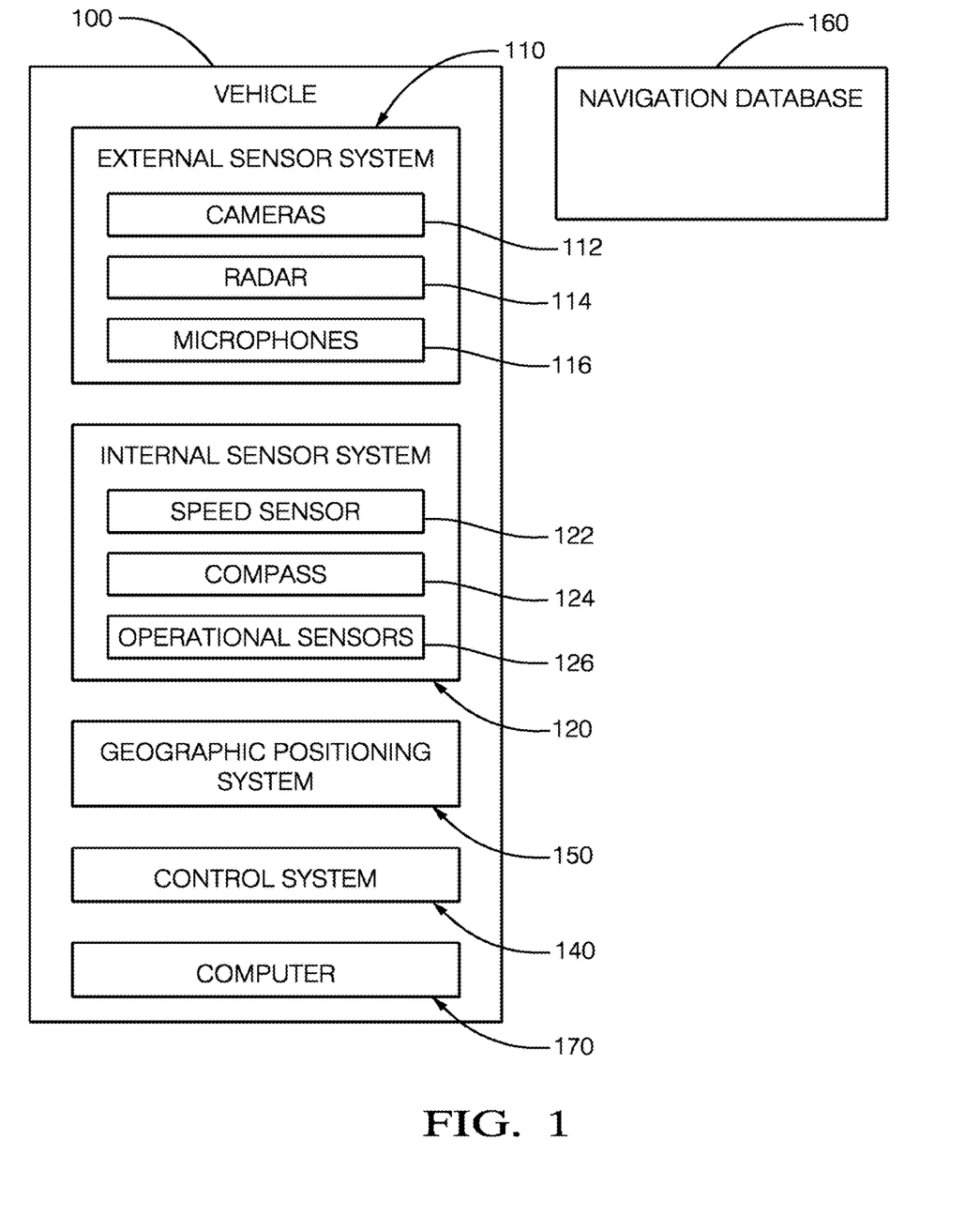
FIG. 1 is a functional block diagram illustrating an autonomous vehicle in accordance with an example embodiment.

FIG. 1 is a functional block diagram of a vehicle 100 in accordance with an example embodiment. Vehicle 100 has an external sensor system 110 that includes cameras 112, radar 114, and microphone 116. Vehicle 100 also includes an internal sensor system 120 that includes speed sensor 122, compass 124 and operational sensors 126 for measuring parameters such as engine temperature, tire pressure, oil pressure, battery charge, fuel level, and other operating conditions. Control systems 140 are provided to regulate the operation of vehicle 100 regarding speed, braking, turning, lights, wipers, horn, and other functions. A geographic positioning system 150 is provided that enables vehicle 100 to determine its geographic location. Vehicle 100 communicates with a navigational database 160 maintained in a computer system outside the vehicle 100 to obtain information about road locations, road conditions, speed limits, road hazards, and traffic conditions. Computer 170 within vehicle 100 receives data from geographic positioning system 150 and navigational database 160 to determine a turn-based routing strategy for driving the vehicle 100 from its current location to a selected destination. Computer 170 receives data from external sensor system 110 and calculates the movements of the vehicle 100 needed to safely execute each step of the routing strategy. Vehicle 100 can operate in a fully autonomous mode by giving instructions to control systems 140 or can operate in a semi-autonomous mode in which instructions are given to control systems 140 only in emergency situations. Vehicle 100 can also operate in an advisory mode in which vehicle 100 is under full control of a driver but provides recommendations and/or warnings to the driver relating to routing paths, potential hazards, and other items of interest.

Figure 2:
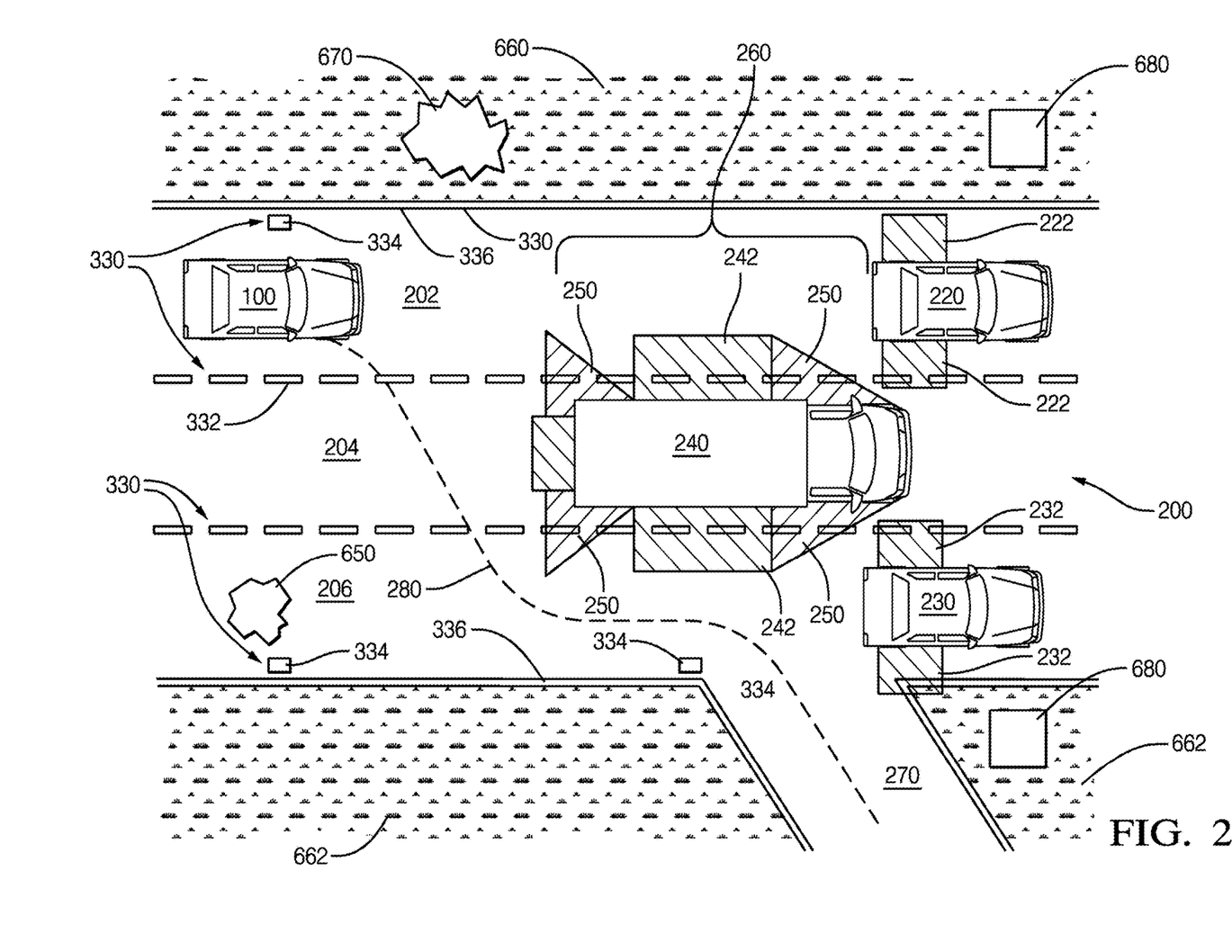
FIG. 2 is a diagram of an autonomous vehicle travelling along a highway in accordance with aspects of the disclosure.

FIG. 2 illustrates vehicle 100 driving along highway 200 including left lane 202, center lane 204, and right lane 206. Other-vehicles 220, 230 and 240 are also travelling along highway 200 in the same direction of travel as vehicle 100. Computer 170 uses data from external sensor system 110 to detect the other-vehicles 220, 230 and 240, to determine their relative positions to vehicle 100 and to identify their blind spots 222, 232 and 242. Other-vehicle 220 and the vehicle 100 are both in the left lane 202 and other-vehicle 220 is in front of vehicle 100. Computer 170 uses speed information from internal sensor system 120 to calculate a safe following distance 260 from other-vehicle 220. In the example of FIG. 2, the routing strategy calculated by computer 170 requires vehicle 100 to exit the highway 200 at ramp 270. In preparation for exiting the highway 200, computer 170 calculates a travel path 280 for vehicle 100 to move from the left lane 202 to the right lane 206 while avoiding the other-vehicles 220, 230, and 240 and their respective blind spots 222, 232 and 242.

Figure 3A:
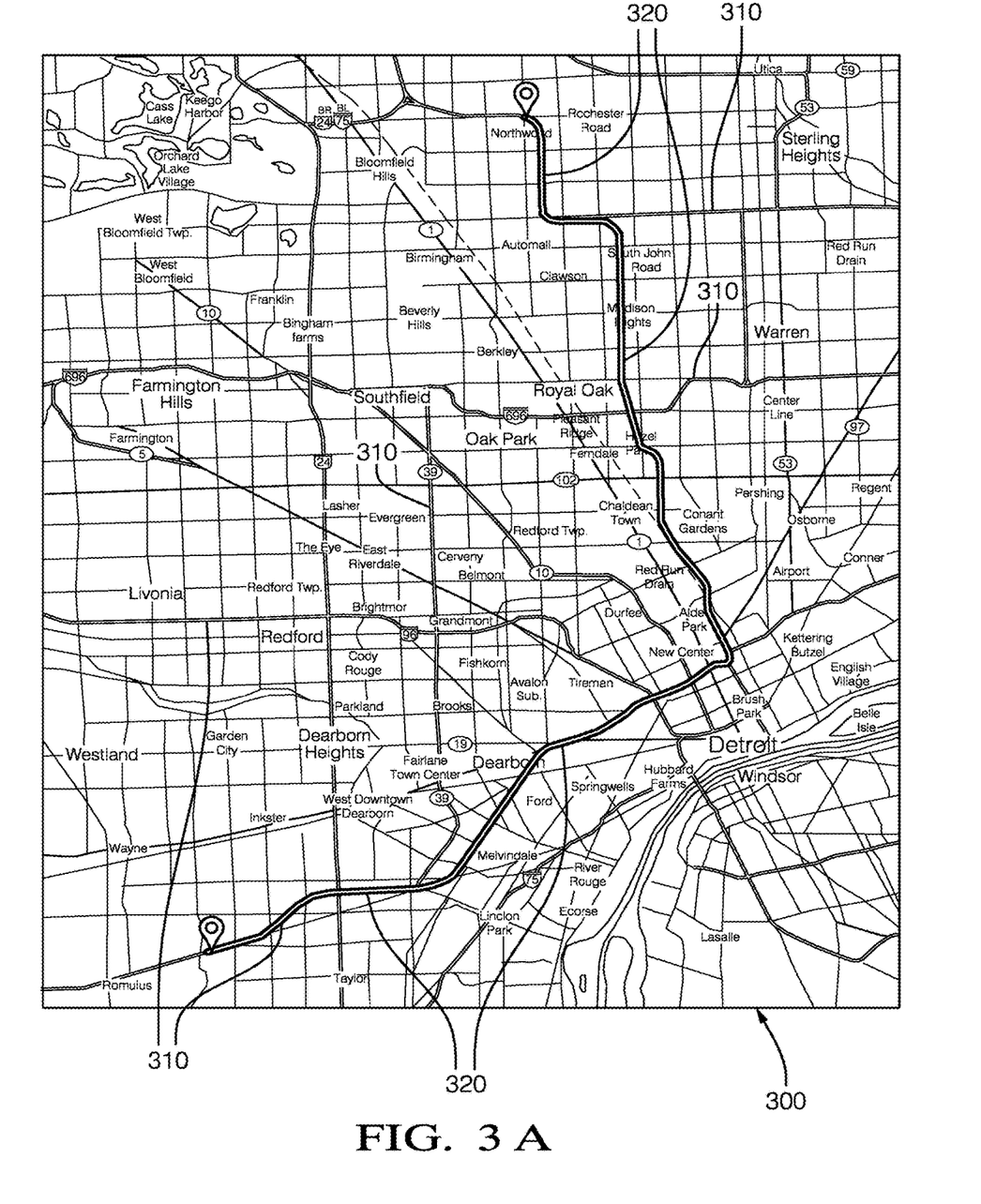
FIG. 3a is a diagram illustrating map data received by an autonomous vehicle from an external database.
Figure 3B:
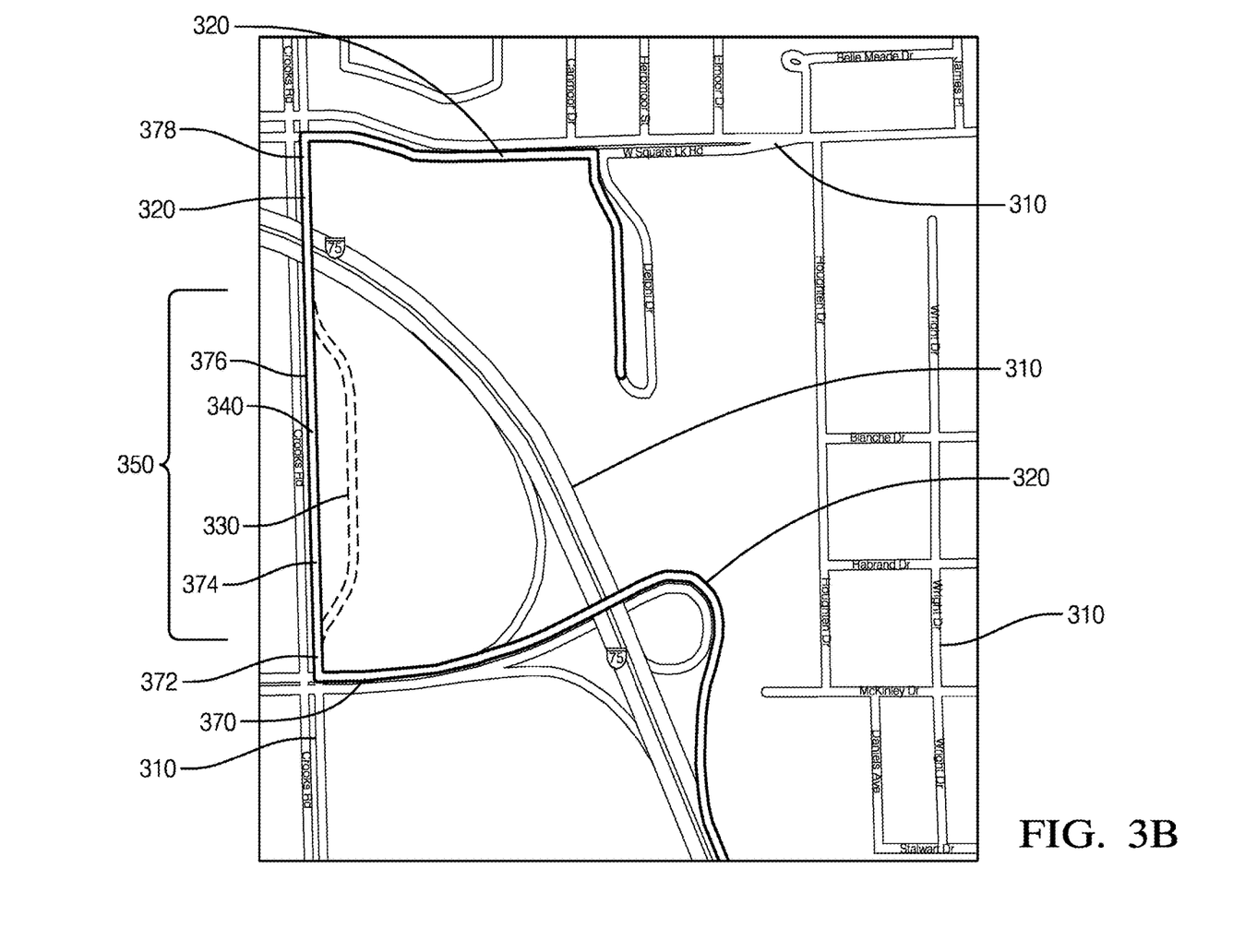
FIG. 3b is an enlarged view of a portion of the map data illustrated in FIG. 3a including map data sensed by the autonomous vehicle in accordance with aspects of the disclosure.

FIG. 3a illustrates map 300 received by computer 170 from navigational database 160. Map 300 includes the location and orientation of road network 310. In the example shown, vehicle 100 is travelling along route 320 calculated by computer 170 or, alternatively, calculated by a computer (not shown) external to vehicle 100 associated with the navigational database 160. FIG. 3b illustrates an enlarged view of one portion of road network 310 and route 320. Fundamental navigational priorities such as direction of travel, target speed and lane selection are made with respect to data received from navigational database 160. Current global positioning system (GPS) data has a margin of error that does not allow for absolute accuracy of vehicle position and road location. Therefore, referring back to FIG. 2, computer 170 uses data from external sensor system 110 to detect instance of road features 330 such as lane lines 332, navigational markers 334, and pavement edges 336 to control the fine positioning of vehicle 100. Computer 170 calculates the GPS coordinates of detected instances of road features 330, identifies corresponding map elements 340, and compares the location of road features 330 and map elements 340. FIG. 3b is an enlarged view of a portion of map 300 from FIG. 3a that shows a map region 350 in which there is a significant discrepancy between road features 330 and map elements 340 as might occur during a temporary detour. As discussed below, significant differences between the calculated position of road features 330 and map elements 340 will cause computer 170 to adjust a routing strategy for vehicle 100.

In an alternative embodiment, road features 330 and map elements 340 can relate to characteristics about the road surface such as the surface material (dirt, gravel, concrete, asphalt). In another alternative embodiment, road features 330 and map elements 340 can relate to transient conditions that apply to an area of the road such as traffic congestion or weather conditions (rain, snow, high winds).

Figure 4:
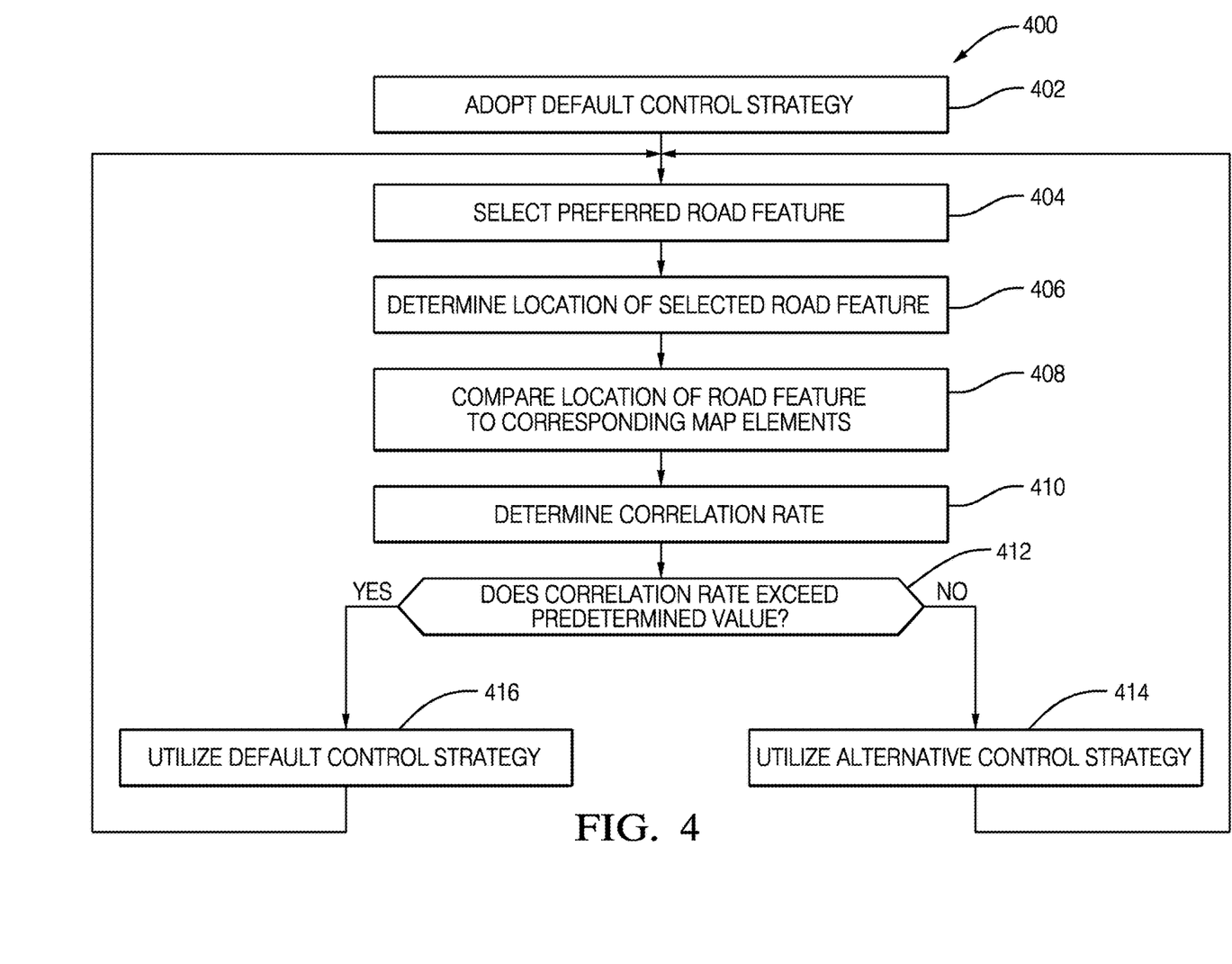
FIG. 4 is a flow chart of a first control method for an autonomous vehicle in accordance with aspects of the disclosure.

FIG. 4 illustrates an example flow chart 400 in accordance with some aspects of the disclosure discussed above. In block 402, computer 170 adopts a default control strategy for vehicle 100. The default control strategy includes a set of rules that will apply when there is a high degree of correlation between road features 330 and map elements 340. For example, under the default control strategy the computer 170 follows a routing path calculated based on the GPS location of vehicle 100 with respect to road network 310 on map 300. Vehicle 100 does not cross lane lines 332 or pavement edges 336 except during a lane change operation. Vehicle target speed is set based on speed limit information for road network 310 contained in navigational database 160, except where user preferences have determined that the vehicle should travel a set interval above or below the speed limit. The minimum spacing between vehicle 100 to surrounding vehicles is set to a standard interval. External sensor system 110 operates in a standard mode in which the sensors scan in a standard pattern and at a standard refresh rate.

In block 404, computer 170 selects a preferred road feature 330 (such as lane lines 332) and determines its respective location. In block 406, computer 170 determines the location of the selected instance of the road feature 330 and in block 408 compares this with the location of a corresponding map element 340. In block 410, computer 170 determines a correlation rate between the location of road feature 330 and corresponding map element 340. In block 412, computer 170 determines whether the correlation rate exceeds a predetermined value. If not, computer 170 adopts an alternative control strategy according to block 414 and reverts to block 404 to repeat the process described above. If the correlation rate is above the predetermined value, computer maintains the default control strategy according to block 416 and reverts to block 404 to repeat the process.

The correlation rate can be determined based on a wide variety of factors. For example, in reference to FIG. 3b computer 170 can calculate the distance between road feature 330 and map element 340 at data points 370, 372, 374, 376, and 378 along map 300. If the distance at each point exceeds a defined value, computer 170 will determine that the correlation rate is below the predetermined value. If this condition is reproduced over successive data points or over a significant number of data points along a defined interval, computer 170 will adopt the alternative control strategy. There may also be locations in which road features 330 are not detectable by the external sensor system 110. For example, lane lines 332 may be faded or covered with snow. Pavement edges 334 may be also covered with snow or disguised by adjacent debris. Data points at which no correlation can be found between road features 330 and map elements 340 could also be treated as falling below the correlation rate even though a specific calculation cannot be made.

In one embodiment of the disclosure, only one of the road features 330, such as lane lines 332, are used to determine the correlation between road features 330 and map elements 340. In other embodiments of the disclosure, the correlation rate is determined based on multiple instances of the road features 330 such as lane lines 332 and pavement edges 336. In yet another embodiment of the disclosure, the individual correlation between one type of road feature 330 and map element 340, such as lane lines 332, is weighted differently than the correlation between other road features 330 and map elements 340, such as pavement edges 334, when determining an overall correlation rate. This would apply in situations where the favored road feature (in this case, lane lines 332) is deemed a more reliable tool for verification of the location of vehicle 100 relative to road network 310.

Figure 5:
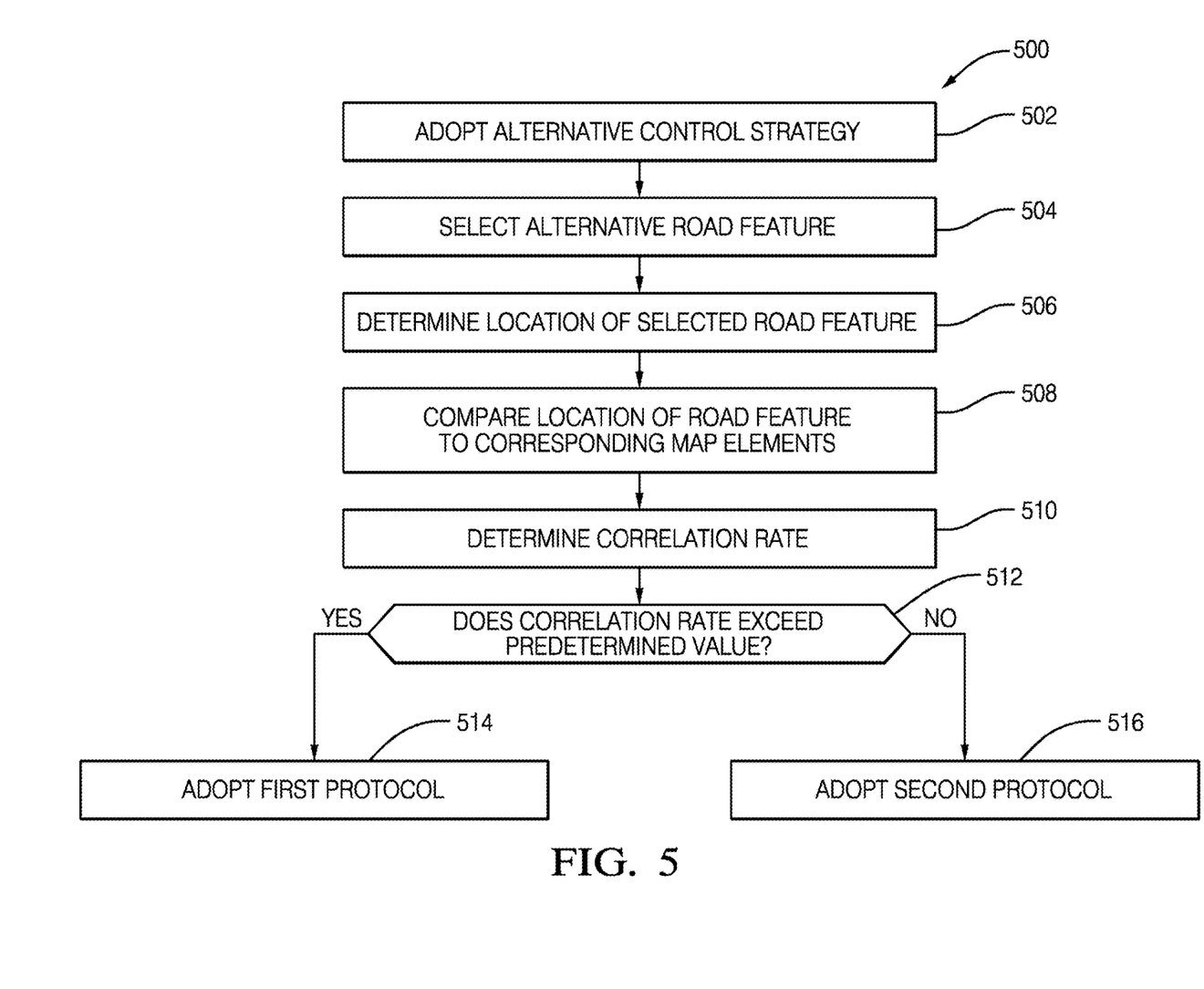
FIG. 5 is a flow chart of a second control method for an autonomous vehicle in accordance with aspects of the disclosure.

FIG. 5 illustrates an example flow chart 500 for the alternative control strategy, which includes multiple protocols depending upon the situation determined by computer 170. In block 502, computer 170 has adopted the alternative control strategy after following the process outlined in FIG. 4. In block 504, computer 170 selects an alternative road feature 330 (such as pavement edges 336) and determines its respective location in block 506. In block 508, computer 170 compares the location of the selected road feature 330 to a corresponding map element 340 and determines a correlation rate in block 510. In block 512, computer 170 determines whether the correlation rate falls above a predetermined value. If so, computer 170 adopts a first protocol for alternative control strategy according to block 514. If not, computer 170 adopts a second protocol for the alternative control strategy according to block 516.

In the first protocol, computer 170 relies on a secondary road feature 330 (such as pavement edges 336) for verification of the location of road network 310 relative to the vehicle 100 and for verification of the position of vehicle 100 within a lane on a roadway (such as the left lane 202 in highway 200, as shown in FIG. 2). In a further embodiment, computer 170 in the first protocol may continue to determine a correlation rate for the preferred road feature 330 selected according to the process outlined in FIG. 4 and, if the correlation rate exceeds a predetermined value, return to the default control strategy.

The second protocol is triggered when the computer is unable to reliably use information about alternative road features 330 to verify the position of the vehicle 100. In this situation, computer 170 may use the position and trajectory of surrounding vehicles to verify the location of road network 310 and to establish the position of vehicle 100. If adjacent vehicles have a trajectory consistent with road network 310 on map 300, computer will operate on the assumption that other vehicles are within designated lanes in a roadway. If traffic density is not sufficiently dense (or is non-existent) such that computer 170 cannot reliably use it for lane verification, computer 170 will rely solely on GPS location relative to the road network 310 for navigational control purposes.

In either control strategy discussed above, computer 170 will rely on typical hazard avoidance protocols to deal with unexpected lane closures, accidents, road hazards, etc. Computer 170 will also take directional cues from surrounding vehicles in situations where the detected road surface does not correlate with road network 310 but surrounding vehicles are following the detected road surface, or in situations where the path along road network 310 is blocked by a detected hazard but surrounding traffic is following a path off of the road network and off of the detected road surface.

In accordance with another aspect of the disclosure, referring back to FIG. 2 computer 170 uses data from external sensor system 110 to detect road hazard 650 on highway 600 and to detect shoulder areas 660 and 662 along highway 200. Computer 170 also uses data from external sensor system 110 to detect hazard 670 in the shoulder area 660 along with structures 680 such as guard rails or bridge supports that interrupt shoulder areas 660, 662.

Computer 170 communicates with navigational database 160 regarding the location of hazards 650, 670 detected by external sensor system 110. Navigational database 160 is simultaneously accessible by computer 170 and other computers in other vehicles and is updated with hazard-location information received by such computers to provide a real-time map of transient hazards. In a further embodiment, navigational database 160 sends a request to computer 170 to validate the location of hazards 650, 670 detected by another vehicle. Computer 170 uses external sensor system 110 to detect the presence or absence of hazards 650, 670 and sends a corresponding message to navigational database 160.

Figure 6A:
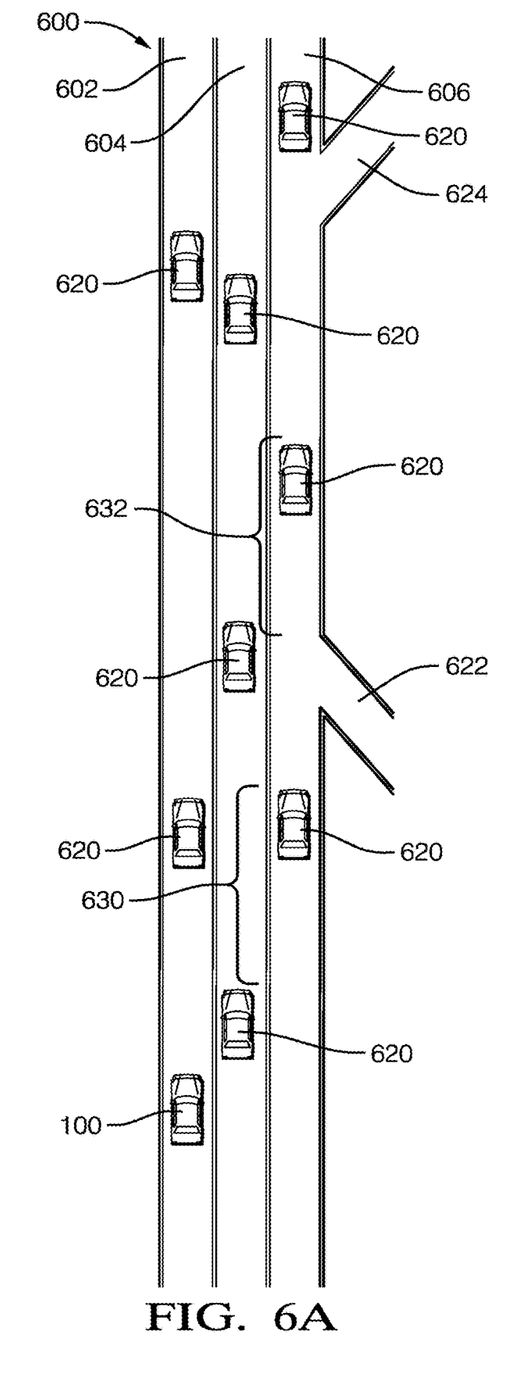
FIG. 6a is diagram of an autonomous vehicle travelling along a highway with a first traffic density in accordance with aspects of the disclosure.

In accordance with another aspect of the disclosure, FIG. 6a illustrates vehicle 100 driving along highway 600 including left lane 602, center lane 604, and right lane 606. Surrounding vehicles 620 are also travelling along highway 600 in the same direction of travel as vehicle 100. Computer 170 receives data from geographic positioning system 150 and navigational database 160 to determine a routing strategy for driving the vehicle 100 from its current location to a selected destination 610. Computer 170 determines a lane-selection strategy based on the number of lanes 602, 604, 606 on highway 600, the distance to destination 610, and the speed of vehicle 100. The lane-selection strategy gives a preference for the left lane 602 when vehicle 100 remains a significant distance from destination 610. The lane-selection strategy also disfavors the right lane in areas along highway 600 with significant entrance ramps 622 and exit ramps 624. The lane selection strategy defines first zone 630 where vehicle 100 should begin to attempt a first lane change maneuver into center lane 604, and a second zone 632 where vehicle should begin to attempt a second lane change maneuver into right lane 606. When vehicle 100 reaches first or second zone 630, 632, computer 170 directs vehicle 100 to make a lane change maneuver as soon as a safe path is available, which could include decreasing or increasing the speed of vehicle 100 to put it in a position where a safe path is available. If vehicle passes through a zone 630, 632 without being able to successfully make a lane change maneuver, vehicle 100 will continue to attempt a lane change maneuver until it is no longer possible to reach destination 610 at which point the computer 170 will calculate a revised routing strategy for vehicle 100.

Figure 6B:
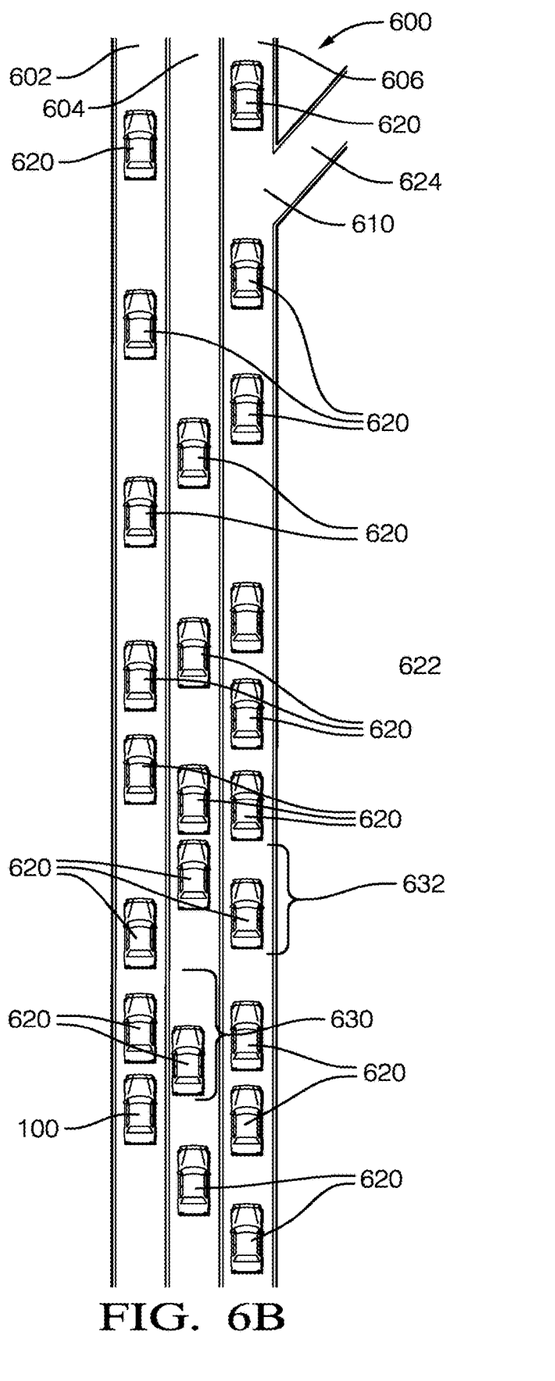
FIG. 6b is diagram of an autonomous vehicle travelling along a highway with a second traffic density in accordance with aspects of the disclosure.

Computer 170 adapts the lane selection strategy in real time based on information about surrounding vehicles 620. Computer 170 calculates a traffic density measurement based on the number and spacing of surrounding vehicles 620 in the vicinity of vehicle 100. Computer 170 also evaluates the number and complexity of potential lane change pathways in the vicinity of vehicle 100 to determine a freedom of movement factor for vehicle 100. Depending upon the traffic density measurement, the freedom of movement factor, or both, computer 170 evaluates whether to accelerate the lane change maneuver. For example, when traffic density is heavy and freedom of movement limited for vehicle 100, as shown in FIG. 7b, computer 170 may locate first and second zones 734 and 736 farther from destination 710 to give vehicle 100 more time to identify a safe path to maneuver. This is particularly useful when surrounding vehicles 620 are following each other at a distance that does not allow for a safe lane change between them.

In another aspect of the disclosure as shown in FIG. 2, computer 170 uses data from external sensor system 110 to detect the other-vehicles 220, 230, and 240 and to categorize them based on size and width into categories such as "car", "passenger truck" and "semi-trailer truck." In FIG. 2, other-vehicles 220 and 230 are passenger cars and other-vehicle 240 is a semi-trailer truck, i.e. a large vehicle. In addition to identifying the blind spots 222, 232 and 242, computer 170 also identifies hazard zones 250 that apply only to particular vehicle categories and only in particular circumstances. For example, in FIG. 2 computer 170 has identified the hazard zones 250 for other-vehicle 240 that represent areas where significant rain, standing water, and/or snow will be thrown from the tires of a typical semi-trailer truck. Based on information about weather and road conditions from navigational database 160, road conditions detected by external sensor system 110, or other sources, computer 170 determines whether the hazard zones 250 are active and should be avoided.

Figure 7:
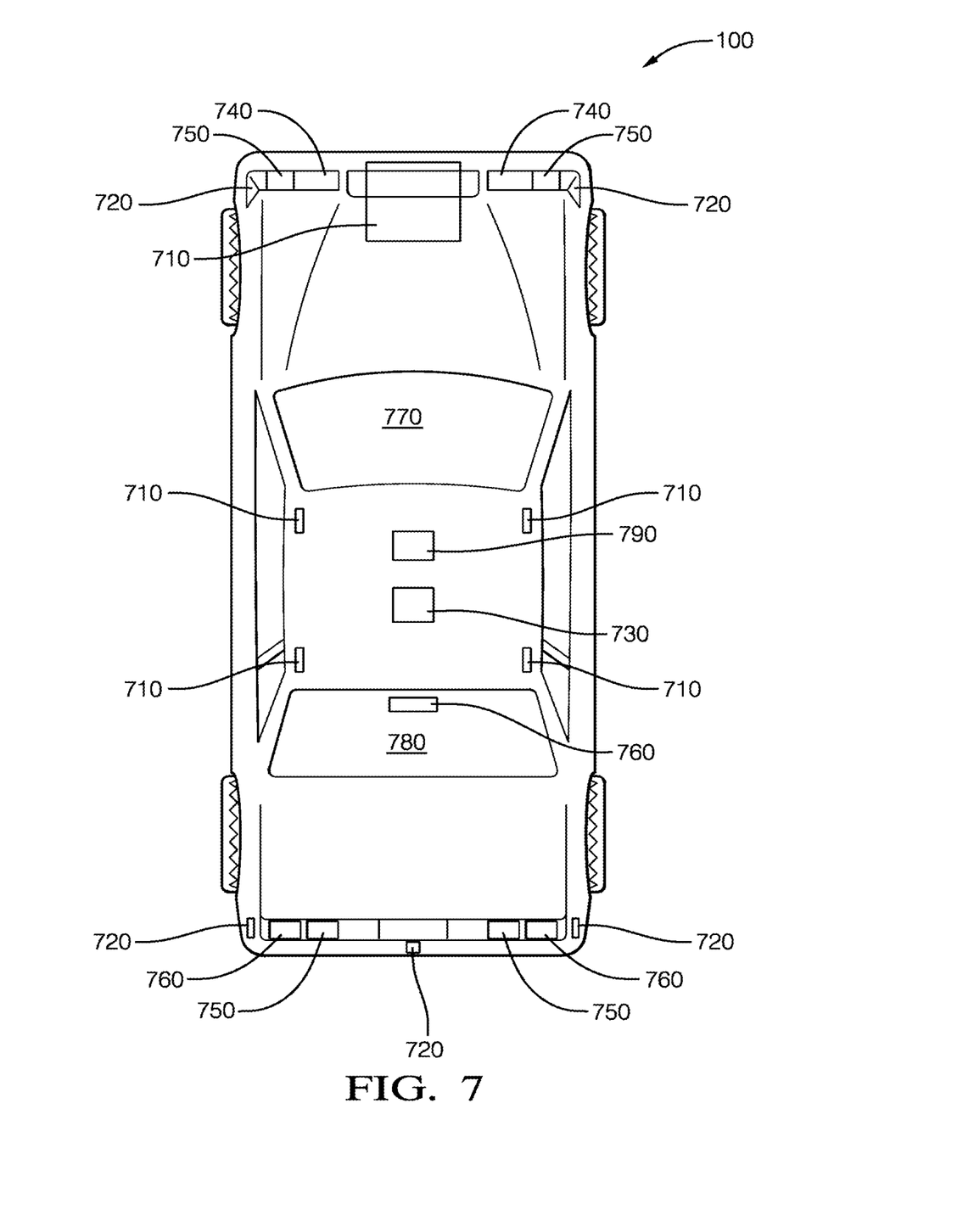
FIG. 7 is a top view of an autonomous vehicle in accordance with an example embodiment.

FIG. 7 illustrates a top view of vehicle 100 including radar sensors 710 and cameras 720. Because a vehicle that is driven under autonomous control will likely have behavior patterns different from a driver-controlled vehicle, it is important to have a signal visible to other drivers that indicates when vehicle 100 is under autonomous control. This is especially valuable for nighttime driving when it may not be apparent that no one is in the driver's seat, or for situations in which a person is in the driver's seat but the vehicle 100 is under autonomous control. For that purpose, warning light 730 is provided and is placed in a location distinct from headlamps 740, turn signals 750, or brake lights 760. Preferably, warning light 730 is of a color other than red, yellow, or white to further distinguish it from normal operating lights/signals 740, 750 and 760. In one embodiment, warning light can comprise an embedded light emitting diode (LED) located within a laminated glass windshield 770 and/or laminated glass backlight 780 of vehicle 100.

One of the complexities of autonomous control of vehicle 100 arises in negotiating the right-of-way between vehicles. Driver-controlled vehicles often perceive ambiguity when following the rules for determining which vehicle has the right of way. For example, at a four-way stop two vehicles may each perceive that they arrived at an intersection first. Or one vehicle may believe that all vehicles arrived at the same time but another vehicle perceived that one of the vehicles was actually the first to arrive. These situations are often resolved by drivers giving a visual signal that they are yielding the right of way to another driver, such as with a hand wave. To handle this situation when vehicle 100 is under autonomous control, yield signal 790 is included on vehicle 100. Computer 170 follows a defined rule set for determining when to yield a right-of-way and activates yield signal 790 when it is waiting for the other vehicle(s) to proceed. Yield signal 790 can be a visual signal such as a light, an electronic signal (such as a radio-frequency signal) that can be detected by other vehicles, or a combination of both.

Figure 8:
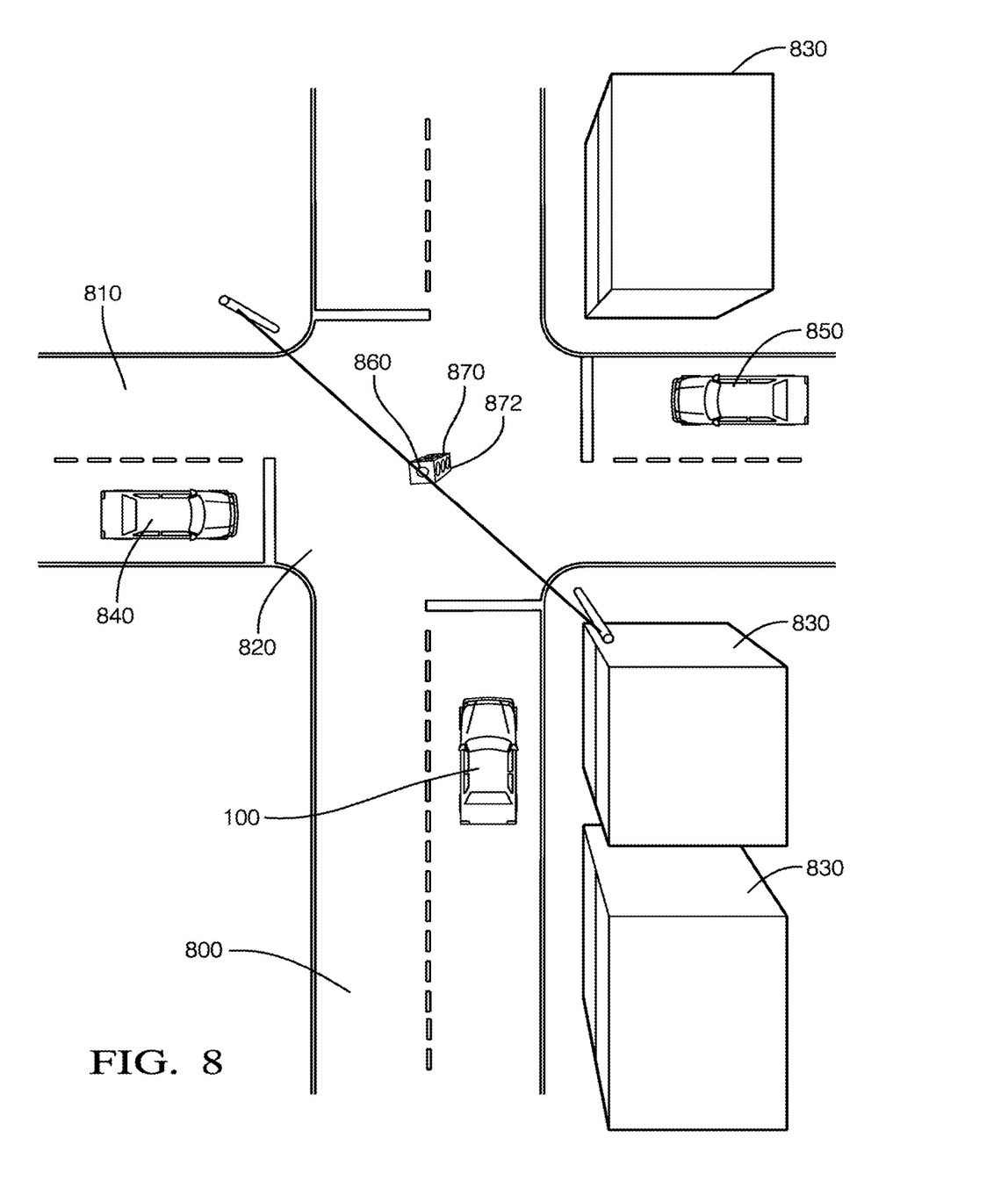
FIG. 8 is a diagram of an autonomous vehicle travelling along a road that has buildings and obstructions adjacent to the road.

In accordance with another aspect of the disclosure, FIG. 8 illustrates vehicle 100 driving along road 800. Road 810 crosses road 800 at intersection 820. Buildings 830 are located along the sides of road 810 and 820. Computer 170 uses data from external sensor system 110 to detect approaching-vehicle 840. However, external sensor system 110 cannot detect hidden-vehicle 850 travelling along road 810 due to interference from one or more buildings 830. Remote-sensor 860 is mounted on a fixed structure 870 (such as a traffic signal 872) near intersection 820 and in a position that gives an unobstructed view along roads 800 and 810. Computer 170 uses data from remote-sensor 860 to determine the position and trajectory of hidden-vehicle 850. This information is used as needed by computer 170 to control the vehicle 100 and avoid a collision with hidden-vehicle 850. For example, if vehicle 100 is approaching intersection 820 with a green light on traffic signal 872, computer 170 will direct the vehicle 100 to proceed through intersection 820. However, if hidden-vehicle 850 is approaching intersection 820 at a speed or trajectory inconsistent with a slowing or stopping behavior, computer 170 will direct vehicle to stop short of intersection 820 until it is determined that hidden-vehicle 850 will successfully stop at intersection 820 or has passed through intersection 820.

The appended claims have been particularly shown and described with reference to the foregoing embodiments, which are merely illustrative of the best modes for carrying out the invention defined by the appended claims. It should be understood by those skilled in the art that various alternatives to the embodiments described herein may be employed in practicing the invention defined by the appended claims without departing from the spirit and scope of the invention as defined in claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the appended claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A method comprising:
   receiving, by one or more computing devices of a vehicle, sensor data from vehicle sensors configured to detect road features in a vicinity of the vehicle;
   updating, based on the sensor data, a map to include locations of at least one of the road features in the vicinity of the vehicle, the map being accessible by multiple vehicles including the vehicle;
   determining, with the one or more computing devices and based on a world coordinate system, coordinates of the road features;
   identifying, based on the at least one of the road features, corresponding map elements;
   comparing the locations of the at least one of the road features to locations of the corresponding map elements;
   determining correlation rates between the locations of the at least one of the road features and the locations of the corresponding map elements; and
   adjusting, based on the correlation rates, a routing control strategy of the vehicle.

2. The method of claim 1, wherein the road features and the corresponding map elements include one or more of lane lines, navigational markers, and road edges.

3. The method of claim 1, further comprising:
   determining, with the one or more computing devices and based on a distance between the road features and the corresponding map elements at a plurality of points along a planned route, the correlation rates.

4. The method of claim 1, further comprising:
   selecting, with the one or more computing devices and based on a hierarchical order of the road features, the road features to compare with the corresponding map elements.

5. The method of claim 4, further comprising:
   applying, with the one or more computing devices and based on the hierarchical order of the road features, weighting factors to the correlation rates.

6. The method of claim 4, further comprising:
selecting, with the one or more computing devices, a first routing control strategy when the correlation rate is greater than a threshold indicative of a high correlation between the locations of a first road feature and a corresponding first map element.

7. The method of claim 6, further comprising:
selecting, with the one or more computing devices, a second routing control strategy when the correlation rate is less than the threshold indicative of a low correlation between the locations of the first road feature and the corresponding first map element.

8. The method of claim 7, further comprising:
selecting, with the one or more computing devices, a second road feature different from the first road feature to compare with a corresponding second map element.

9. The method of claim 8, further comprising:
selecting, with the one or more computing devices, a first control protocol when the correlation rate of the locations of the second road feature and the corresponding second map element is greater than a threshold.

10. The method of claim 9, further comprising:
verifying, with the one or more computing devices, a location of a road network relative to the vehicle and verifying a position of the vehicle within a lane of a roadway based on the second road feature.

11. The method of claim 8, further comprising:
selecting, with the one or more computing devices, a second control protocol when the correlation rate of the locations of the second road feature and the corresponding second map element is less than a threshold.

12. The method of claim 11, further comprising:
verifying, with the one or more computing devices, a location of a road network relative to the vehicle and verifying a position of the vehicle within a lane of a roadway based on positions and trajectories of surrounding vehicles.

13. The method of claim 11, further comprising:
verifying, with the one or more computing devices, a location of a road network relative to the vehicle and verifying a position of the vehicle within a lane of a roadway based solely on a remote positioning system location of the vehicle relative to the road network.

14. The method of claim 1, further comprising:
determining, with the one or more computing devices, whether any of the road features constitute a hazard;
updating the map to include information about the hazard;
receiving a request from a navigational database to validate locations of hazards detected by another vehicle; and
sending a corresponding message to the navigational database confirming a presence or absence of hazards detected by the other vehicle.

15. A system comprising:
one or more computing devices of a vehicle configured to:
receive sensor data from vehicle sensors configured to detect road features in a vicinity of a vehicle;
update, based on the sensor data, a map to include locations of at least one of the road features in the vicinity of the vehicle, the map being accessible by multiple vehicles including the vehicle;
determine, based on a world coordinate system, coordinates of the road features;
identify, based on the at least one of the road features, corresponding map elements;
compare the locations of the at least one of the road features to locations of the corresponding map elements;
determine correlation rates between the locations of the at least one of the road features and the locations of the corresponding map elements; and
adjust, based on the correlation rates, a routing control strategy of the vehicle.

16. The system of claim 15, wherein the road features and the corresponding map elements include one or more of lane lines, navigational markers, and road edges.

17. The system of claim 15, wherein the one or more computing devices are further configured to determine the correlation rates based on a distance between the road features and the corresponding map elements at a plurality of points along a planned route.

18. The system of claim 15, wherein the one or more computing devices are further configured to:
select, based on a hierarchical order of the road features, the road features to compare with the corresponding map elements; and
apply, based on the hierarchical order of the road features, weighting factors to the correlation rates.

19. The system of claim 15, wherein the one or more computing devices are further configured to:
select, based on a hierarchical order of the road features, the road features to compare with the corresponding map elements; and
select a first routing control strategy when the correlation rate is greater than a threshold indicative of a high correlation between the locations of a first road feature and a corresponding first map element.

20. The system of claim 19, wherein the one or more computing devices are further configured to:
select a second routing control strategy when the correlation rate is less than the threshold indicative of a low correlation between the locations of the first road feature and the corresponding first map element; and
select a second road feature different from the first road feature to compare with a corresponding second map element.

21. A non-transitory computer readable medium comprising program instructions for causing one or more computing devices of a system to:
receive sensor data from vehicle sensors configured to detect road features in a vicinity of a vehicle;
update, based on the sensor data, a map to include locations of at least one of the road features in the vicinity of the vehicle, the map being accessible by multiple vehicles including the vehicle;
determine, based on a world coordinate system, coordinates of the road features;
identify, based on the at least one of the road features, corresponding map elements;
compare the locations of the at least one of the road features to locations of the corresponding map elements;
determine correlation rates between the locations of the at least one of the road features and the locations of the corresponding map elements; and
adjust, based on the correlation rates, a routing control strategy of the vehicle.

* * * * *